(12) United States Patent
Matsui

(10) Patent No.: US 10,191,223 B2
(45) Date of Patent: Jan. 29, 2019

(54) OPTICAL CONNECTOR

(71) Applicant: Sumitomo Electric Industries, Ltd., Osaka-shi (JP)

(72) Inventor: Takashi Matsui, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/804,317

(22) Filed: Nov. 6, 2017

(65) Prior Publication Data
US 2018/0136412 A1 May 17, 2018

(30) Foreign Application Priority Data
Nov. 14, 2016 (JP) .................................. 2016-221731

(51) Int. Cl.
*G02B 6/38* (2006.01)

(52) U.S. Cl.
CPC ........... *G02B 6/3831* (2013.01); *G02B 6/387* (2013.01); *G02B 6/3812* (2013.01); *G02B 6/3869* (2013.01); *G02B 6/3871* (2013.01); *G02B 6/3877* (2013.01); *G02B 6/3887* (2013.01)

(58) Field of Classification Search
CPC ... G02B 6/3831; G02B 6/3869; G02B 6/3887
USPC ........................................................ 385/39
See application file for complete search history.

(56) References Cited

U.S. PATENT DOCUMENTS

| | | | |
|---|---|---|---|
| 5,396,572 A | 3/1995 | Bradley et al. | |
| 5,751,875 A | 5/1998 | Edwards et al. | |
| 6,238,103 B1* | 5/2001 | Ezawa | G02B 6/3855 385/81 |
| 6,868,101 B1* | 3/2005 | Lowenhar | G02B 6/4202 372/26 |
| 7,419,309 B2* | 9/2008 | Faika | G02B 6/3897 385/53 |
| 2009/0148101 A1* | 6/2009 | Lu | G02B 6/3816 385/56 |
| 2016/0349463 A1* | 12/2016 | Akashi | G02B 6/4285 |

FOREIGN PATENT DOCUMENTS

JP    H07-077630 A    3/1995

\* cited by examiner

*Primary Examiner* — Jerry Blevins
(74) *Attorney, Agent, or Firm* — Venable LLP; Michael A. Sartori; Laura G. Remus

(57) ABSTRACT

An optical connector is disclosed. The optical connector provides a first plug, a second plug, a sleeve, a spring, and a shell. The first plug and the second plug jointly rotate without rubbing end surfaces of ferrules thereof. The second plug provides a projection, while, the shell provides a hollow that receives the projection of the second plug. The first plug is pushed against the second plug by the spring put between the first plug and the shell but unable to be detached from the second plug because of the projection of the second plug mated with the hollow of the shell, thereby the ferrules in the respective plugs make physical contact in the respective end surfaces.

15 Claims, 8 Drawing Sheets

OPTICAL CONNECTOR

BACKGROUND OF THE INVENTION

1. Field of the Invention

The present invention relates to an optical connector.

2. Background Arts

A Japanese Patent application laid open No. JP-07-077630A has disclosed an optical fiber connector having a key and a slot paired with the key. The optical fiber connector disclosed therein includes a male connector that has a key and a cam slot, and a female connector that provides a coupling sleeve and a pin. Inserting a cylindrical ferrule of the male connector into the coupling sleeve in the female connector and rotating the cam slot and the pin by 90°, the male connector may be engaged with the female connector.

Such an optical connector may be engaged each other by rotating the cam slot and the pin by 90°, which rubs end surfaces of the ferrules abutting to each other and possibly causes scratches on the end surfaces. An optical ferrule having a scratched end surface may increase optical coupling loss.

SUMMARY OF THE INVENTION

An aspect of the present invention relates to an optical connector that provides a first plug, a second plug, a sleeve, a spring, and a shell that encloses the first and second plugs, the sleeve, and the spring therein. The first plug secures a first fiber that has a first ferrule in an end thereof. The second plug secures a second fiber that also has a second ferrule in an end thereof. The first ferrule and the second ferrule jointly rotate without rubbing the end surfaces thereof. The sleeve receives the first ferrule from one end and the second ferrule in another end. The spring is put between the first plug and the shell to push the first plug outward of the shell, thereby forming physical contact between the end surfaces of the ferrules. A feature of the optical connector of the present invention is that the second plug has a projection, while, the shell has a hollow that engages with the projection of the second plug.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENT

Next, embodiment according to the present invention will be described as referring to accompanying drawings. In the description of the drawings, numerals or symbols same with or similar to each other will refer to elements same with or similar to each other without duplicating explanations.

Figure 1:
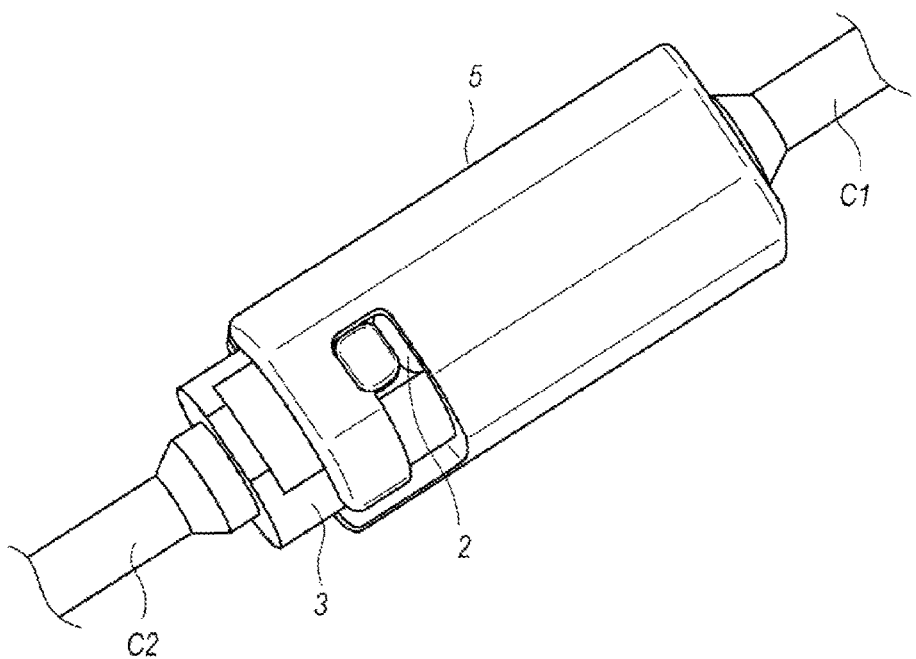
FIG. 1 is a perspective view showing an optical connector according to embodiment of the present invention.
Figure 2:
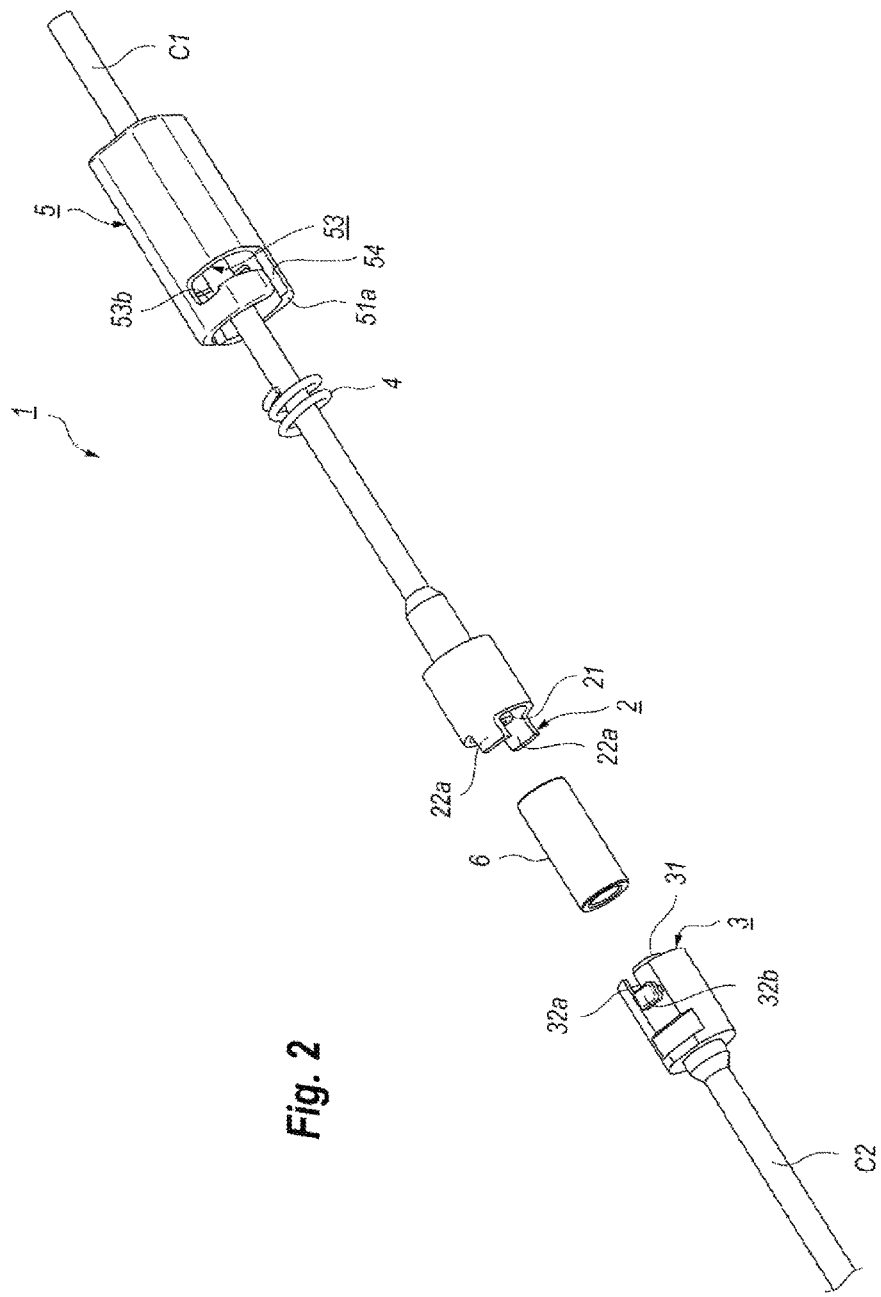
FIG. 2 is an exploded perspective view of the optical connector shown in FIG. 1.

FIG. 1 is a perspective view showing an optical connector 1 according to embodiment of the present invention, FIG. 2 is an exploded perspective view of the optical connector 1. The optical connector 1 of the embodiment, which is secured in respective tips of two fiber cables, C1 and C2, couples these fiber cables, C1 and C2. Specifically, the optical connector 1 includes a first plug 2 secured in the tip of the first fiber cable C1, a second plug 3 secured in the tip of the second optical cable C2, a coil spring 4 passing the first fiber cable C1 therethrough, a shell 5 that encloses the first plug 2 and the coil spring 4, and a split sleeve 6. The coil spring 4, when enclosed within the shell 5, pushes the first plug 2 against the second plug 3. The split sleeve 6 aligns a ferrule 21 secured within the first plug 2 with a ferrule 31 secured within the second plug 3.

Figure 3:
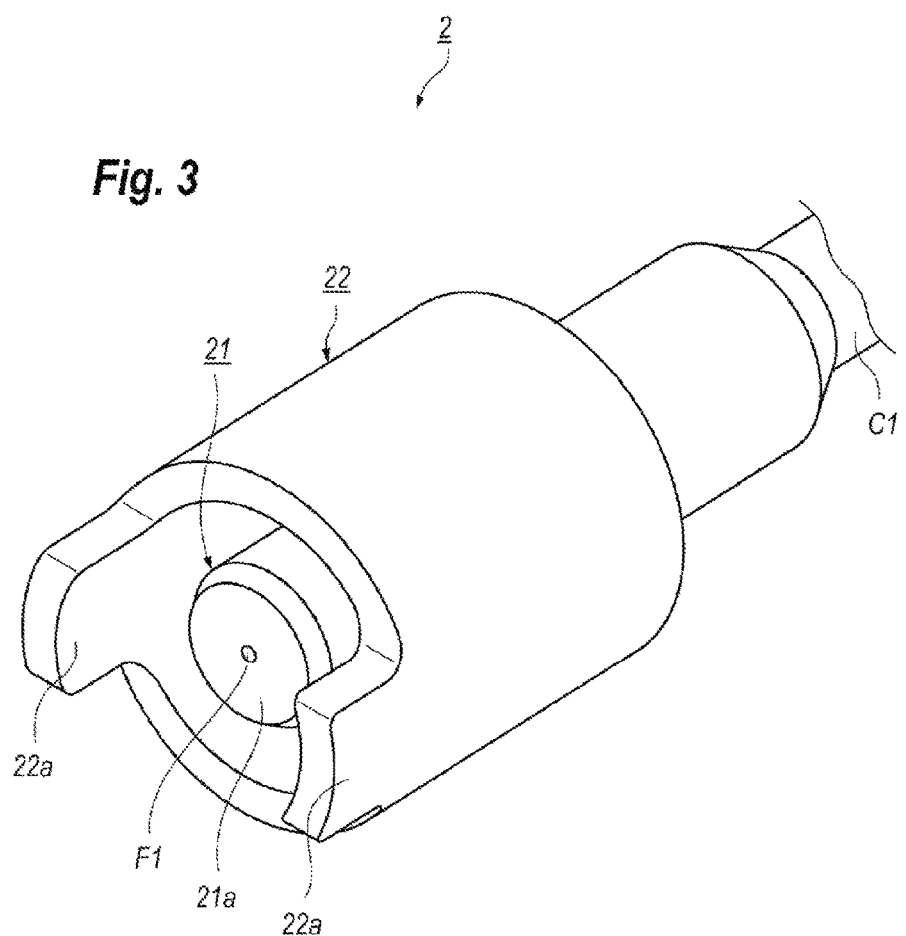
FIG. 3 is a perspective view showing the first plug.

FIG. 3 is a perspective view showing the first plug 2. The first plug 2, which may be made of metal, includes the ferrule 21 that secures an optical fiber F1 in the first fiber cable C1 and a cylindrical shell 22 made of metal. The ferrule 21, which may be made of zirconia ceramics, has an end surface 21a that is processed in a flat surface concurrently with the optical fiber F1. The metal shell 22 includes a pair of tabs 22a each extending from an end of the shell 22 along an optical axis of the optical fiber F1. The tabs 22a are provided in the end of the shell 22 in positions symmetrical with the optical fiber F1, that is, the tabs 22a are disposed in positions making an angle of 180° with respect to the axis of the optical fiber F1.

Figure 4:
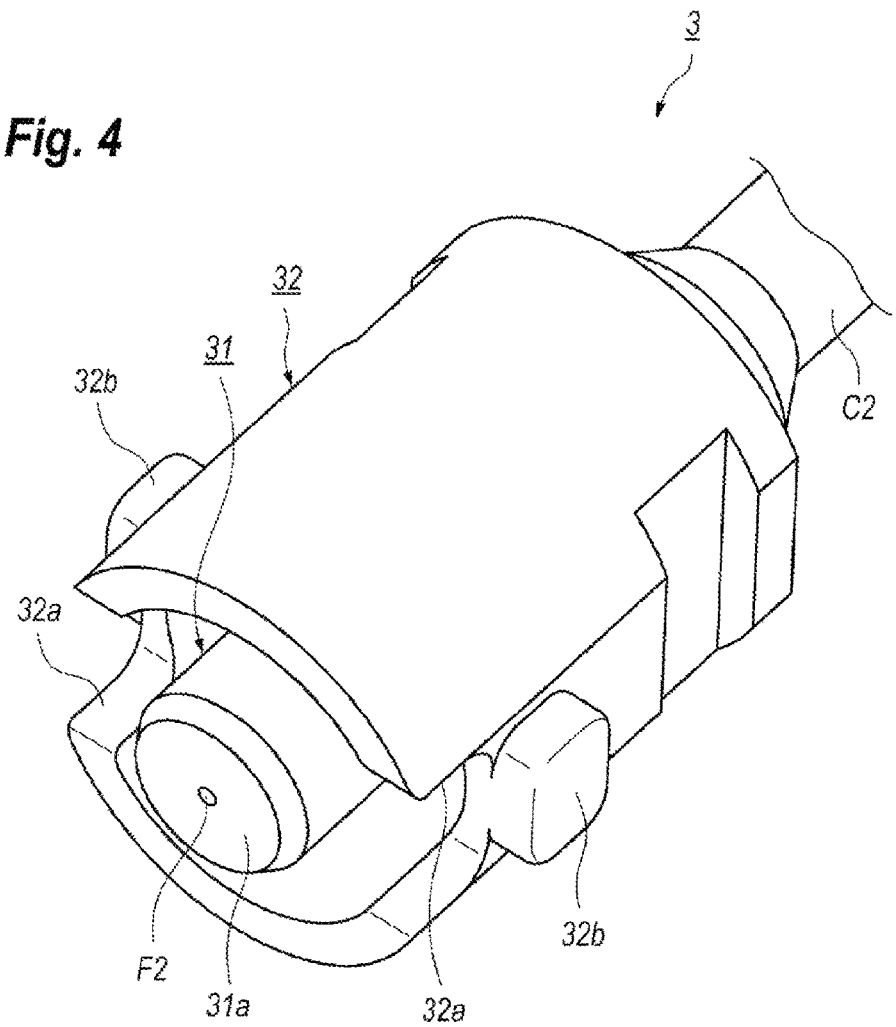
FIG. 4 is a perspective view showing the second plug.

FIG. 4 is a perspective view showing the second plug 3. The second plug 3, which may be also made of metal, includes the ferrule 31 and a cylindrical shell 32 that surrounds the ferrule 31. The ferrule 31 may be also made of zirconia ceramics same with the former ferrule 21. The ferrule 31 in an end thereof is processed in a flat surface accompanied with the optical fiber F2, thereby making a physical contact against the end of the other ferrule 21.

The cylindrical shell 32 includes a pair of cuts 32a each receiving the tabs 22a in the first plug 2. The cuts 32a accompany with projections 32b in respective ends. The cuts 32a and the projections 32b are arranged in respective positions symmetrical to each other with respect to the axis of the optical fiber F2. That is, the cuts 32a and the projections 32b are formed in the respective positions of the point symmetry for the optical fiber F2. The projections 32b mate with cuts 54 and slits 53 of the shell 5, which will be described later.

Figure 5A:
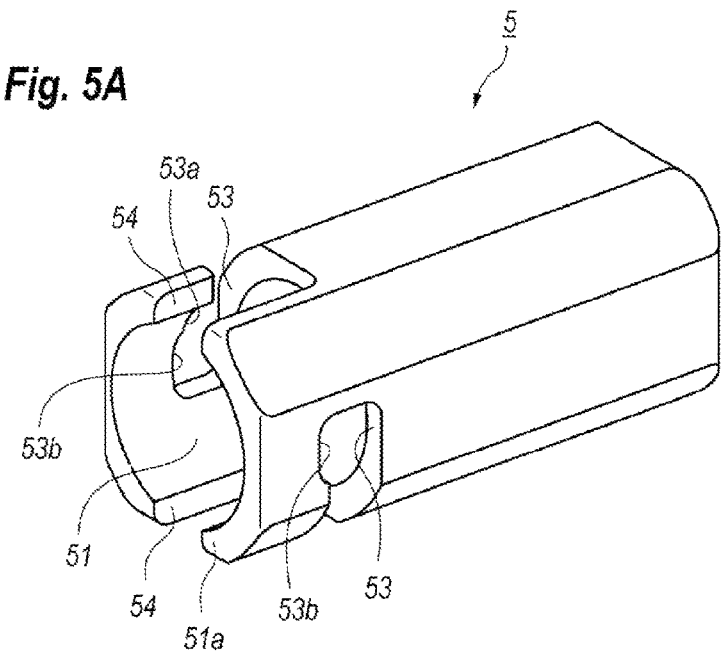
FIGS. 5A and 5B are perspective views showing the shell.
Figure 5B:
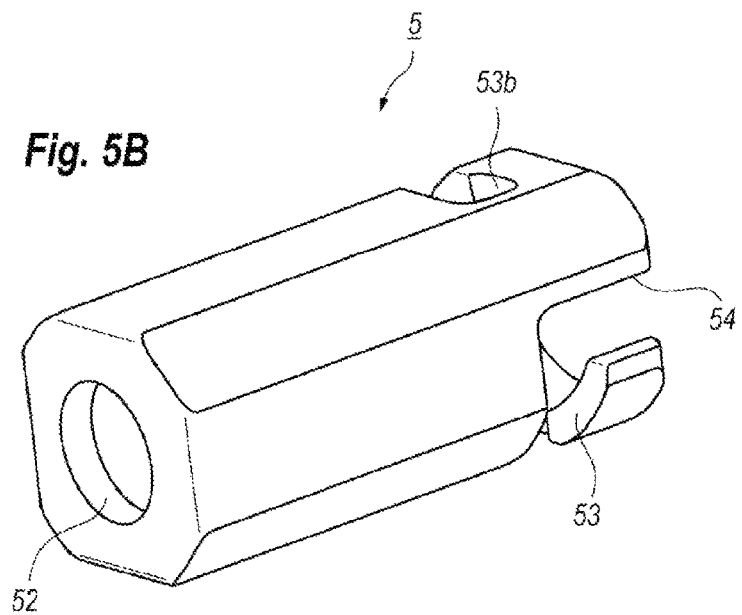

FIGS. 5A and 5B are perspective views showing the shell 5. The shell 5 has a rectangular outer shape with chamfered corners and a bore 51, a diameter of which is greater than outer diameters of the shells, 22 and 32, in the first and second plugs, 2 and 3. The bore 51 becomes an opening 52 in one of ends of the shell 5, where the opening 52 passes the fiber cable C1 of the first plug 2. The opening 52 has a diameter greater than the outer diameters of the first and second plugs, 2 and 3, thereby the bore 51 may receive the first and second plugs, 2 and 3, as passing the fiber cables, C1 and C2, in the opening 52.

The shell 5 further provides a pair of slits 53 and a pair of cuts 54 each extending from an end of the slit 53 to an edge 51a of the bore 51, or the shell 5. The edge 51a faces the second plug 3 when the first plug 2 mates with the second plug 3. The slit 53 continues the edge 51a through the cut 54. The cut 54 extends from one of the ends of the slit 53 to the edge 51a of the shell 5. The slit 53 in another end thereof provides a hollow 53b retreating toward the edge 51a of the shell 5 and accompanies an edge 53a from the cut 54 to the hollow 53b. The edge 53a extends from the cut 54 as making an angle smaller than a right angle with respect to the cut 54, or as gradually increasing a distance to the edge 51a of the shell 5.

Figure 6:
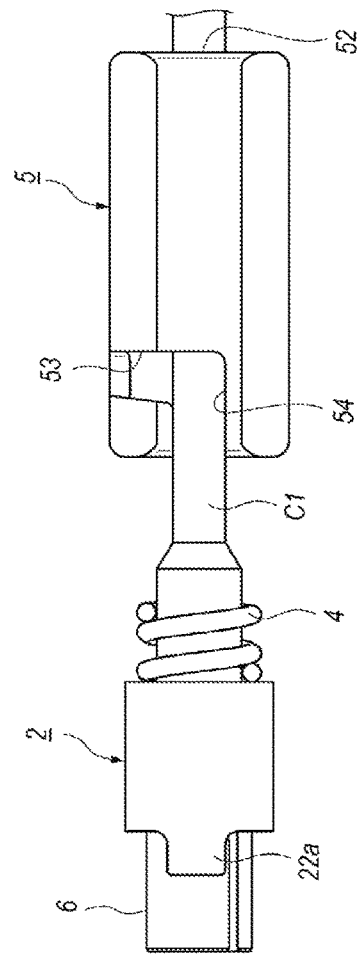
FIG. 6 is a side view showing components in the optical connector.
Figure 6:
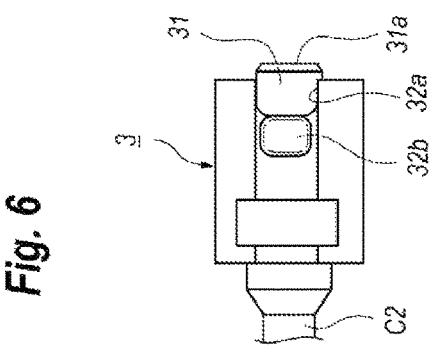

FIG. 6 is a side view showing components in the optical connector. Passing the first plug 2 through the opening 52 in the shell 5 as the coil spring 4 passes the optical fiber cable C1, the tabs 22a in the first plug 2 mate within the cuts 32a in the second plug 3. Mating arrangement between the tabs 22a and the cuts 32a may effectively prevent the first plug 2 and the second plug 3 from rotating around the axes thereof independently. Also, the projections 32b in the second plug 3 enter within the cuts 54 in the shell 5. Rotating the second plug 3 by 90° with respect to the shell 5, the projections 32b slide in the slits 53 and fall in the hollows 53b pushed by the coil spring 4.

The mechanism to mate the first plug 2 with the second plug 3 will be further described. The tabs 22a in the first plug 2 mate with the cuts 32a in the second plug 3 as described above but the end surface, 21a and 31a, of the respective ferrules, 21 and 31, are not in contact, that is, two end surfaces, 21a and 31a, make a gap therebetween. Two end surfaces, 21a and 31a, come in contact to each other when the first and the second plugs, 2 and 3, are inserted within the bore 51 of the shell 5 and the projections 32b of the second plug 3 enter into the end of the cuts 5 as opposing repulsive force by the coil spring.

Figure 7A:
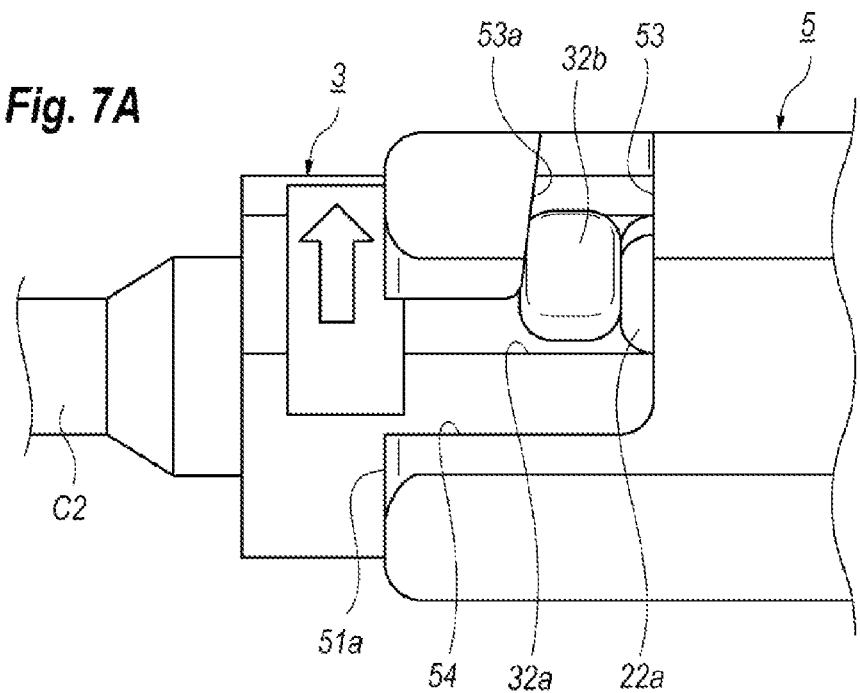
FIGS. 7A and 7B show the optical connector mating the first plug with the second plug.
Figure 7B:
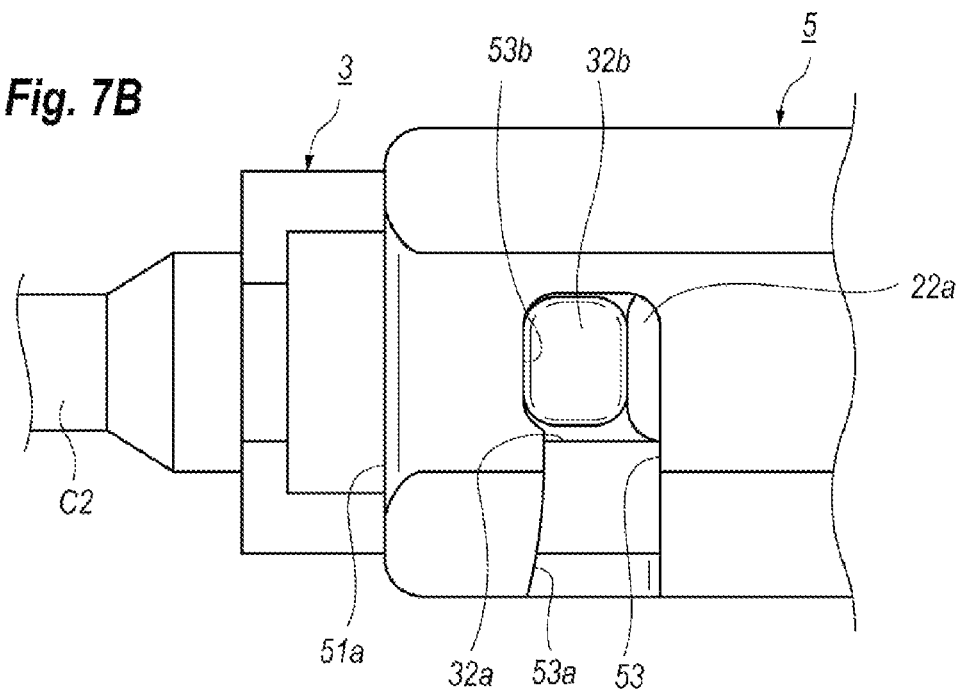

FIGS. 7A and 7B show the optical connector mating the first plug 2 with the second plug 3. Rotating the second plug 3 by 90° against the shell 5, the projection 32b slides on the edge 53a to the end of the slit 53 and finally enters into the hollow 53b. Then, the coil spring 4, which is compressed at that instant, pushes the first and the second plugs, 2 and 3, outward from the shell 5. However, because the projection 32b is set within the hollow 53b, the first and the second plugs, 2 and 3, are held within the shell 5. Also, because the coil spring 4 is compressed, the end surfaces, 21a and 31a, of the ferrules, 21 and 31, are kept in contact to each other.

The edge 53a in the slit 53 makes the projection 32b apart from the edge 51a as rotating the first and second plugs, 2 and 3, which compresses the coil spring 4. Accordingly, the end surfaces, 21a and 31a, of the ferrules, 21 and 31, butt further tightly as rotating the first and the second plugs, 2 and 3. However, the engagement of the tabs 22a with the cuts 32a may effectively prevent the first and the second plugs, 2 and 3, in the end surfaces, 21a and 31a, thereof from rubbing. The end surfaces, 21a and 31a, may be protected from being scratched.

The optical connector 1 thus described may be applied for another type of optical fiber. That is, the description above concentrates on the optical fiber type of single mode fiber; but the optical connected is applicable to a type of, what is called, polarization maintaining fiber (PMF). Setting the first fiber F1 in the slow axis thereof parallel to the tabs 21a, while, the second fiber F2 in the slow axis thereof parallel to the cuts 31a; two PMFs may align the polarization direction thereof.

The shell 5 disposes two cuts 54 and two slits 53 in positions symmetry with respect to the optical axis thereof. The slit 53 circumferentially extends by a quarter of a whole circumference from the cut 54. That is, the cut 54 and the hollow 53b are arranged as making a right angle (90°) with respect to the optical axis. Thus, enclosing the first plug 2 with the shell 5, inserting the projection 32b of the second plug 3 into the cut 54, and rotating the second plug 3 by 90°, the projection 32b may be set within the hollow 53b. Because the tabs 21a of the first plug 2 mate with the cuts 32a of the second plug 3, the first and second plugs, 2 and 3, may jointly rotate without twisting, and the optical fibers, F1 and F2, in root portions neighbor to the respective plugs, 2 and 3, may be prevented from twisting as the second plug 3 rotates.

Figure 8:
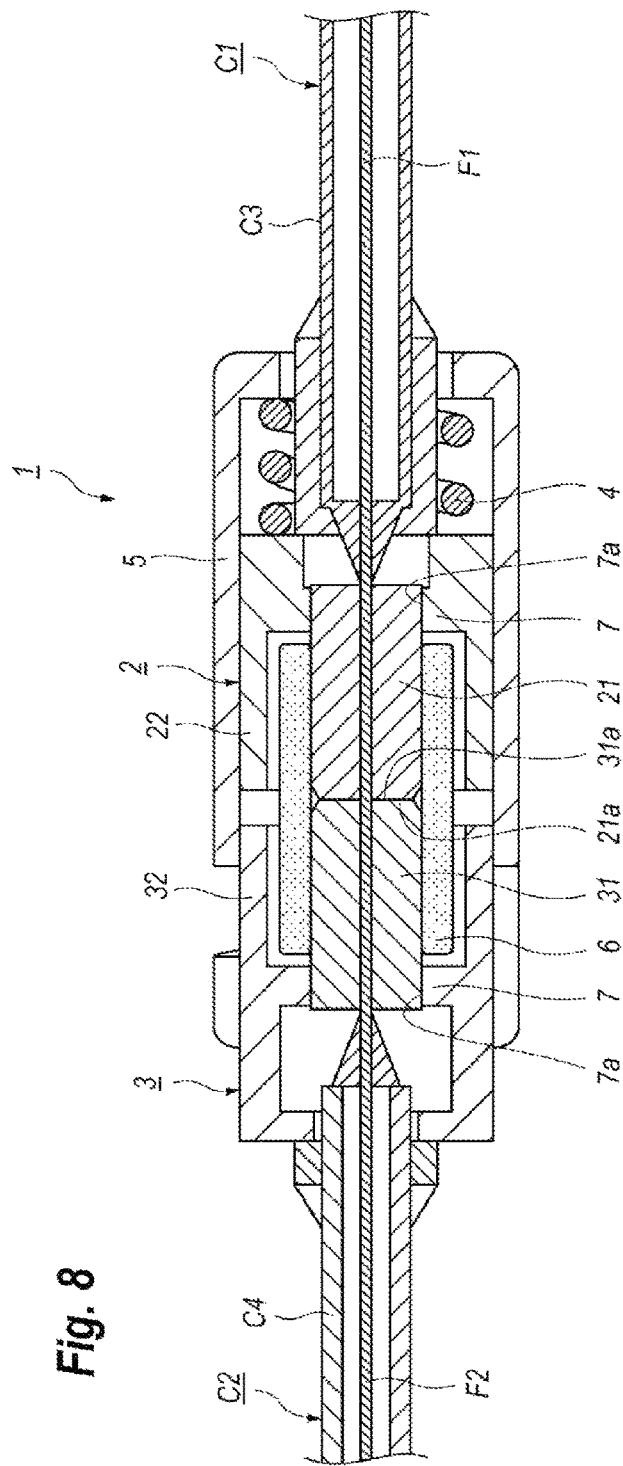
FIG. 8 shows a cross section of the optical connector.

FIG. 8 shows a cross section of the optical connector 1 when two plugs, 2 and 3, engage with each other. The ferrules, 21 and 31, are press-fitted into bores 7a provided in rear walls 7 of the respective plugs, 2 and 3. Because the ferrules, 21 and 31, are made of ceramics, specifically, made of zirconia ceramics, the press-fitting may be carried out in the ferrules, 21 and 31. The optical fibers, F1 and F2, are fixed to the cylindrical shells, 22 and 32, by resin in respective fiver sheaths, C1 and C2.

While particular embodiment of the present invention have been described herein for purposes of illustration, many modifications and changes will become apparent to those skilled in the art. For instance, the embodiment provides the first plug 2 with the tabs 22a, while, the second plug 3 provides the cuts 32a; but, the first plug 2 may provide the cuts, while, the second plug 3 may provide the tabs. Also, the embodiment provides a pair of tabs in one of the plugs and a pair of cuts in another plug. However, the number of the tabs and the cuts may be not restricted to two (2), the plug may provide only one tab, while, another plug may provide only one cut. The optical connector may provide a rigid sleeve substituting the split sleeve. Accordingly, the appended claims are intended to encompass all such modifications and changes as fall within the true spirit and scope of this invention.

The present application claims the benefit of priority of Japanese Patent Application No. 2016-221731, filed on Nov. 14, 2016, which is incorporated herein by reference.

What is claimed is:

1. An optical connector comprising:
   a first plug that secures a first fiber with a first ferrule in an end thereof;
   a second plug that secures a second fiber with a second ferrule in an end thereof, the first plug and the second plug jointly rotating around an optical axis common to the first ferrule and the second ferrule, the second plug having a projection;
   a sleeve that receives the first ferrule of the first plug in one end thereof and the second ferrule of the second plug in another end thereof;
   a shell that encloses the first plug and the second plug therein, the shell providing a hollow that engages with the projection of the second plug; and
   a spring provided between the first plug and the shell, the spring pushing the first plug against the second plug outward from the shell,
   wherein the first ferrule of the first plug makes physical contact against the second ferrule of the second plug,
   wherein the shell has a slit and a cut, the slit providing the hollow in one end thereof,
   wherein the cut extends from an edge of the shell facing the second plug to another end of the slit, and
   wherein the slit circumferentially extends on a surface of the shell and has an edge closer to the edge of the shell, the edge of the slit making a distance to the edge of the shell gradually increasing from the end continuous to the cut to the hollow.

2. The optical connector according to claim 1,
wherein the slit circumferentially extends on a surface of the shell by a length corresponding to 90° around the optical axis.

3. The optical connector according to claim 1,
wherein the second plug provides a pair of projections and the shell provides a pair of hollows each receiving the projections of the second plug.

4. The optical connector according to claim 3,
wherein the projections in the second plug and the hollows in the shell are formed in positions symmetrical with respect to the optical axis.

5. The optical connector according to claim 1,
wherein the first plug provides one of a tab and a cut, and the second plug provides another of a tab and a cut that engages with the one of the tab and the cut of the first plug for rotating the first plug and the second plug jointly.

6. The optical connector according to claim 5,
wherein the first plug provides one of a pair of tabs and a pair of cuts, and the second plug provides another of a pair of tabs and a pair of cuts that engage with the one of the pair of the tabs and the pair of the cuts of the first plug for rotating the first plug and the second plug jointly.

7. The optical connector according to claim 6,
wherein the pair of the tabs in the first plug or the second plug, and the pair of the cuts in the first plug or the second plug are each formed in positions symmetrical with respect to the optical axis.

8. The optical connector according to claim 6,
wherein the first fiber and the second fiber are polarization maintaining fibers with a slow axis aligned with a direction connecting the pair of the tabs or the pair of the cuts.

9. The optical connector according to claim 1,
wherein the sleeve is a type of split sleeve.

10. The optical connector according to claim 1,
wherein the first plug and the second plug provide respective cylindrical shells, and
wherein the first ferrule is press-fit to the cylindrical shell of the first plug and the second ferrule is press-fit to the cylindrical shell of the second plug.

11. The optical connector according to claim 1,
wherein the first ferrule and the second ferrule are made of zirconia ceramics.

12. An optical connector comprising:
a first plug that secures a first fiber with a first ferrule in an end thereof;
a second plug that secures a second fiber with a second ferrule in an end thereof, the first plug and the second plug jointly rotating around an optical axis common to the first ferrule and the second ferrule, the second plug having a projection;
a sleeve that receives the first ferrule of the first plug in one end thereof and the second ferrule of the second plug in another end thereof;
a shell that encloses the first plug and the second plug therein, the shell providing a hollow that engages with the projection of the second plug; and
a spring provided between the first plug and the shell, the spring pushing the first plug against the second plug outward from the shell,
wherein the first ferrule of the first plug makes physical contact against the second ferrule of the second plug, and
wherein the first plug provides one of a tab and a cut, and the second plug provides another of a tab and a cut that engages with the one of the tab and the cut of the first plug for rotating the first plug and the second plug jointly.

13. The optical connector according to claim 12,
wherein the first plug provides one of a pair of tabs and a pair of cuts, and the second plug provides another of a pair of tabs and a pair of cuts that engage with the one of the pair of the tabs and the pair of the cuts of the first plug for rotating the first plug and the second plug jointly.

14. The optical connector according to claim 13,
wherein the pair of the tabs in the first plug or the second plug, and the pair of the cuts in the first plug or the second plug are each formed in positions symmetrical with respect to the optical axis.

15. The optical connector according to claim 13,
wherein the first fiber and the second fiber are polarization maintaining fibers with a slow axis aligned with a direction connecting the pair of the tabs or the pair of the cuts.

* * * * *